(12) United States Patent
Perkuhn et al.

(10) Patent No.: US 10,455,447 B2
(45) Date of Patent: Oct. 22, 2019

(54) METHODS AND DEVICES FOR CONTENT DELIVERY CONTROL

(75) Inventors: Heiko Perkuhn, Bonn (DE); Markus Kampmann, Andernach (DE); Rene Rembarz, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1229 days.

(21) Appl. No.: 14/125,976

(22) PCT Filed: Oct. 12, 2011

(86) PCT No.: PCT/EP2011/067834
§ 371 (c)(1),
(2), (4) Date: Jan. 23, 2014

(87) PCT Pub. No.: WO2012/175145
PCT Pub. Date: Dec. 27, 2012

(65) Prior Publication Data
US 2014/0198641 A1 Jul. 17, 2014

Related U.S. Application Data

(60) Provisional application No. 61/499,906, filed on Jun. 22, 2011.

(51) Int. Cl.
*H04W 28/02* (2009.01)
*H04W 4/18* (2009.01)
(Continued)

(52) U.S. Cl.
CPC ....... *H04W 28/0289* (2013.01); *H04L 67/322* (2013.01); *H04W 4/021* (2013.01); *H04W 4/18* (2013.01); *H04W 4/06* (2013.01)

(58) Field of Classification Search
CPC .................................................. H04L 67/322
See application file for complete search history.

(56) References Cited

U.S. PATENT DOCUMENTS 8,341,255 B2 * 12/2012 Gopalakrishnan ............ 709/223
2003/0204472 A1 10/2003 Yamagishi
(Continued)

FOREIGN PATENT DOCUMENTS

CN 1787687 A 6/2006
CN 101237705 A 8/2008
(Continued)

OTHER PUBLICATIONS

3GPP. "Technical Specification Group Services and System Aspects;Transparent end-to-end packet switched streaming service (PSS);General description (Release 9)" 3GPP TS 26.233 V9.0.0. Dec. 2009. 3GPP, Sophia Antipolis, France.
(Continued)

*Primary Examiner* — Kevin M Cunningham
(74) *Attorney, Agent, or Firm* — Coats & Bennett, PLLC

(57) ABSTRACT

To control content delivery to plural clients (6) of a mobile communication network (1), a network entity (5) of the mobile communication network (1) collects geo information of the plural clients (6) and evaluates the collected geo information of the plural clients (6) based on a rule to determine whether the content delivery is to be adapted. The network entity (5) identifies a region for which the content delivery is to be adapted. The network entity (5) selectively outputs a message (9) to a controlling entity (10) if it is determined that the content delivery is to be adapted. The controlling entity (10) controls the content delivery in response to receiving the message (9), to adapt the content delivery for clients located in the identified region.

18 Claims, 9 Drawing Sheets

(51) Int. Cl.
*H04L 29/08* (2006.01)
*H04W 4/021* (2018.01)
*H04W 4/06* (2009.01)

(56) References Cited

U.S. PATENT DOCUMENTS

| | | | |
|---|---|---|---|
| 2006/0013136 A1* | 1/2006 | Goldschmidt | H04L 47/10 370/235 |
| 2006/0023656 A1* | 2/2006 | Anglin, Jr. | H04W 72/005 370/328 |
| 2008/0072264 A1* | 3/2008 | Crayford | 725/86 |
| 2010/0296449 A1* | 11/2010 | Ishii | H04L 1/1874 370/328 |
| 2011/0013538 A1* | 1/2011 | Henocq et al. | 370/253 |
| 2011/0154132 A1* | 6/2011 | Aybay | H04L 43/026 714/49 |
| 2011/0158187 A1* | 6/2011 | Komamura et al. | 370/329 |
| 2012/0307635 A1* | 12/2012 | Kahn et al. | 370/232 |

FOREIGN PATENT DOCUMENTS

| | | |
|---|---|---|
| CN | 101904197 A | 12/2010 |
| CN | 101959252 A | 1/2011 |
| TW | I221571 B | 10/2004 |
| TW | I305470 B | 1/2009 |
| TW | I327839 B | 7/2010 |
| WO | 2006002681 A1 | 1/2006 |
| WO | 2007033262 A3 | 3/2007 |
| WO | 2008016694 A2 | 2/2008 |
| WO | 2011044287 A1 | 4/2011 |

OTHER PUBLICATIONS

3GPP. "Technical Specification Group Services and System Aspects;Transparent end-to-end Packet-switched Streaming Service (PSS); Progressive Download and Dynamic Adaptive Streaming over HTTP (3GP-DASH) (Release 10)" 3GPP TS 26.247 V10.0.0. Jun. 2011. 3GPP, Sophia Antipolis, France.

* cited by examiner

METHODS AND DEVICES FOR CONTENT DELIVERY CONTROL

TECHNICAL FIELD

The invention relates to methods of controlling content delivery to plural clients of a mobile communication network and to corresponding devices.

BACKGROUND

The delivery of content to clients of a mobile communication network is of significant interest. Delivery of media, such as audio, pictures or video has widespread applicability. Technical implementations may be based on streaming technologies. The streaming may be live streaming or on demand. The delivery of content may also be made by download. For illustration, media delivery to vehicles is regarded as being interesting. A significant fraction of radio consumption happens in the car, and always being able to reach the favorite stations may be of interest to both users and service providers. At the same time, audio streaming has low driver distraction risk. Further examples for delivery of content include various car infotainment features, such as delivery of video to a backseat entertainment system, online gaming via a backseat entertainment system, but also traffic and navigation information. Movies may be delivered to a car over the mobile communication network for viewing at a backseat entertainment system. Additional examples for the delivery of content to clients of a mobile communication network include the delivery of video or other media to handheld devices, or online gaming for handheld devices. The access network of the mobile communication network may prone to experiencing an overload situation when a large number of people located in the same area, such as a school yard, wishes to view the same movie at the same time.

Different technical implementations of media streaming to vehicles or other clients are conceivable. For streaming over a wireless communication network, the streaming solution should provide adaptability to accommodate fluctuating link rates of the current wireless link.

Adaptive streaming may utilize the Real-Time Transport Protocol (RTP) as transport protocol, and the Real-Time Streaming Protocol (RTSP) as session initiation and control protocol. Another approach to implement adaptive streaming is based on adaptive Hypertext Transfer Protocol (HTTP) streaming. In the latter case, media may be stored at a streaming server as a sequence of media files encoded with different rates. The client may be informed before the session or updated during the session about the different media files and the associated bit rates via the transfer of a corresponding manifest file. In response thereto, the client may execute rate adaptation by requesting a media file with the suited bit rate from the server. An adaptive streaming solution is described in 3GPP TS 26.233 V9.0.0 (2009-12), for example.

In such adaptive streaming solutions, rate adaptation is carried out on an individual session level. This limits flexibility in adapting content delivery. For illustration, as the number of clients which request content delivery increases, congestion situations in the radio access network may become more likely. The service provider which offers the content only has limited options to react to such situations when quality degradation is executed at an individual session and user level. Also, conventional adaptive streaming also makes it challenging to take into account constraints which may be due to, for example, agreements on data volumes which may be delivered by a given service provider over a given communication network.

SUMMARY

It is the object to alleviate or obviate at least some of the above drawbacks, and to provide improved methods and devices for controlling content delivery.

According to an embodiment, a method of controlling content delivery to plural clients of a mobile communication network is provided. The content is delivered to the plural clients over a radio access network of the mobile communication network. A network entity associated with the mobile communication network collects geo information of the plural clients. The network entity evaluates the collected geo information of the plural clients based on a rule to determine whether the content delivery is to be adapted and to identify a region for which the content delivery is to be adapted. The network entity selectively outputs a message to a controlling entity if it is determined that the content delivery is to be adapted. The controlling entity controls the content delivery in response to receiving the message, to adapt the content delivery for clients located in the identified region.

According to another embodiment, a controlling entity configured to control content delivery to plural clients of a mobile communication network is provided. The controlling entity comprises an interface for communication with a network entity of the mobile communication network and a controller. The controller is configured to output a rule for evaluating geo information of the plural clients to the network entity over the interface. The controller is configured to receive a message from the network entity over the interface, the message containing information on a location-dependent adaptation of the content delivery. The controller is configured to adapt the content delivery in a location-dependent manner for clients located in a region based on the received message, which region is determined based on the information on a location-dependent adaptation.

According to another embodiment, a method of controlling content delivery to plural clients of a mobile communication network is provided. The method comprises outputting a rule for evaluating geo information of the plural clients to a network entity of the mobile communication network. The method comprises receiving a message from the network entity, the message containing information on a location-dependent adaptation of the content delivery. The method comprises adapting the content delivery in a location-dependent manner for clients located in a region based on the received message, which region is determined based on the information on a location-dependent adaptation. The method may be performed by a controlling entity for controlling content delivery.

According to another embodiment, a network entity for a mobile communication network is provided. The network entity comprises a receiver configured to receive geo information of plural clients of the mobile communication network. The network entity comprises an interface configured to receive a rule from a controlling entity controlling content delivery to the plural clients. The network entity comprises a processing unit configured to evaluate the received geo information of the plural clients based on the received rule to determine whether the content delivery is to be adapted and identify a region for which the content delivery is to be adapted. The processing unit is configured to selectively output a message over the interface if it is determined that the content delivery is to be adapted.

According to another embodiment, a method is provided for determining whether a location-specific adaptation of content delivery to plural clients of a mobile communication network is required. A network entity of the mobile communication network collects geo information of the plural clients. The network entity evaluates the collected geo information of the plural clients based on a rule to determine whether the content delivery is to be adapted and to identify a region for which the content delivery is to be adapted. The network entity selectively outputs a message to a controlling entity if it is determined that the content delivery is to be adapted. The network entity may receive the rule from the controlling entity.

According to another embodiment, a system is provided which comprises a mobile communication network having a network entity of an embodiment and a controlling entity of an embodiment. The system may further comprise a content source for delivering content to clients of the mobile communication network via a radio access network of the mobile communication network.

In the methods and devices of embodiments, information about the locations of plural clients is taken into account for content delivery adaptation. This affords enhanced versatility in adapting content delivery.

According to further embodiments, other methods, devices, systems, or computer program products for implementing the methods may be provided.

DETAILED DESCRIPTION OF EMBODIMENTS

Figure 1:
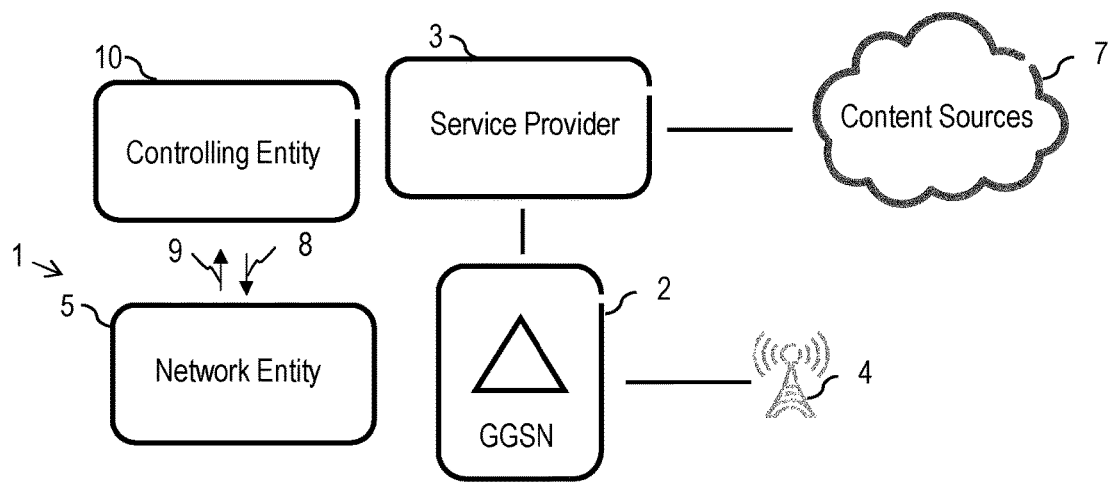
FIG. 1 is a schematic illustration of a system in which concepts according to embodiments of the invention may be implemented.

In the following, the invention will be explained in more detail with reference to exemplary embodiments and to the accompanying drawings in which identical or corresponding reference numerals designate identical or corresponding entities. The illustrated embodiments relate to concepts of controlling content delivery. Examples for such content delivery include audio streaming, video streaming, or other media streaming. Additional examples include the downloading of media or other content. The delivery may be live or on demand. Some embodiments and the entities used therein may be described in the context of mobile communication networks operative according to a given standard, such as the 3GPP (Third Generation Partnership Project) Technical Specifications (TSs). It is to be understood that the illustrated concepts may be applied in other types of communication networks as well.

FIG. 1 illustrates a system in which concepts of embodiments may be implemented. Content is delivered to clients over a mobile communication network 1. A service provider 3 may offer media content via live streaming or may offer content on demand. The content may be stored at one or plural content sources 7. The content sources 7 may provide the content, which is ultimately delivered to clients via the mobile communication network 1. The content may be delivered via a node of the mobile communication network 1, such as a GGSN (Gateway GPRS Support Node) 2. Other nodes may be used in other network technologies. For illustration, the node 2 may be a PDN (Packet Data Network) Gateway which provides connectivity between a client and external packet data networks. The mobile communication network 1 may be configured for operation according to LTE (Long Term Evolution). The mobile communication network 1 may have a core network architecture which is the SAE (System Architecture Evolution) of LTE. The content may be transmitted to the clients of the mobile communication network over a radio access network (RAN) 4.

According to embodiments, the content delivery may be adapted. Situations in which an adaptation of content delivery is performed include situations in which there is a congestion situation in the RAN, or in which a congestion situation is anticipated, in a certain region covered by the mobile communication network. In this case, the content delivery may be adapted to relieve the RAN in the affected region. A region in which a congestion in the RAN already occurs, or in which the congestion is anticipated to occur in the future unless counter-measures are taken, will be referred to as "affected region". The affected region is identified by a network entity of the mobile communication network.

The adaptation of the content delivery may be implemented using information collected by, or otherwise available in or retrieved by, the mobile communication network 1. The adaptation of the content delivery may be based on geo information of plural clients. Thereby, a location-dependent adaptation of content delivery may be implemented. Other external information may be used, for example to anticipate local congestion situations in the RAN. Such information may include any one, or any combination of, time of day, topological information of the mobile communication network 1, road traffic conditions, information on service types of service provider and information on subscription types of clients. It is not required that the conditions in the RAN be actually measured to perform an adaptation of the content delivery.

A network entity 5 is associated with the mobile communication network 1. The network entity 5 may be located within the mobile communication network 1. The network entity 5 may be responsible for collecting geo information of clients, i.e. information on locations of clients. The network entity 5 may communicate with other entities to collect the geo information of clients. For illustration, the network entity 5 may retrieve the geo information from a geo cast service, e.g. from a server of the geo cast service. The network entity 5 may be configured to make this information directly available to a controlling entity 10 or to another third party. For enhanced privacy and/or to reduce data traffic, the network entity 5 may be configured to evaluate the collected geo information in accordance with a rule. Based on a result of the evaluation, the network entity 5 may selectively output a message 9 to the controlling entity 10, or another third party, to inform the controlling entity 10, or the other third party, of the result of the evaluation. The network entity 5 may have an interface to receive a rule 8 for evaluating the collected geo information of the clients. The rule 8 may be injected by the service provider 3, for example via the controlling entity 10.

The controlling entity 10 may be located outside the mobile communication network 1. I.e., the controlling entity 10 may be provided such that it is under the control of a party other than the operator of the mobile communication network 1. The controlling entity 10 may be operative to decide which measures are taken to relieve the RAN in regions which are affected by a present or anticipated congestion situation. The controlling entity 10 may be configured to take any one, or any combination, of plural different measures to relieve the RAN. The controlling entity 10 may also be configured to decide on an extent by which the content delivery is to be adapted. The different measures which may be taken under the control of the controlling entity 10 include an adaptation of a content delivery rate at which a content source 7 provides content to clients located in an identified region. Alternatively or additionally, the controlling entity 10 may perform a quality of service (QoS) bearer adaptation in the mobile communication network 1 to adjust a guaranteed bit rate for the QoS bearer over which the content is delivered. Alternatively or additionally, the controlling entity 10 may prioritize clients located in the identified region based on subscription information. The adaptation of the content delivery may be implemented at the application layer.

The controlling entity 10 may transmit one or several control messages to put the adaptation of the content delivery into effect. The execution of the adaptation may take place via execution points which may also be located outside the mobile communication network 1.

The execution of the adaptation may alternatively or additionally take place in the clients of the mobile communication network.

The system of FIG. 1 may be configured to implement a closed control loop. Quality of Experience (QoE) reports may be received by the service provider 3 or the controlling entity 10. The QoE reports may be evaluated against the adaptation which was made, and/or against the rules 8 which were injected into the network entity 5. The QoE reports may be used as feedback to adapt the rules 8 injected into the network entity 5.

Figure 2:
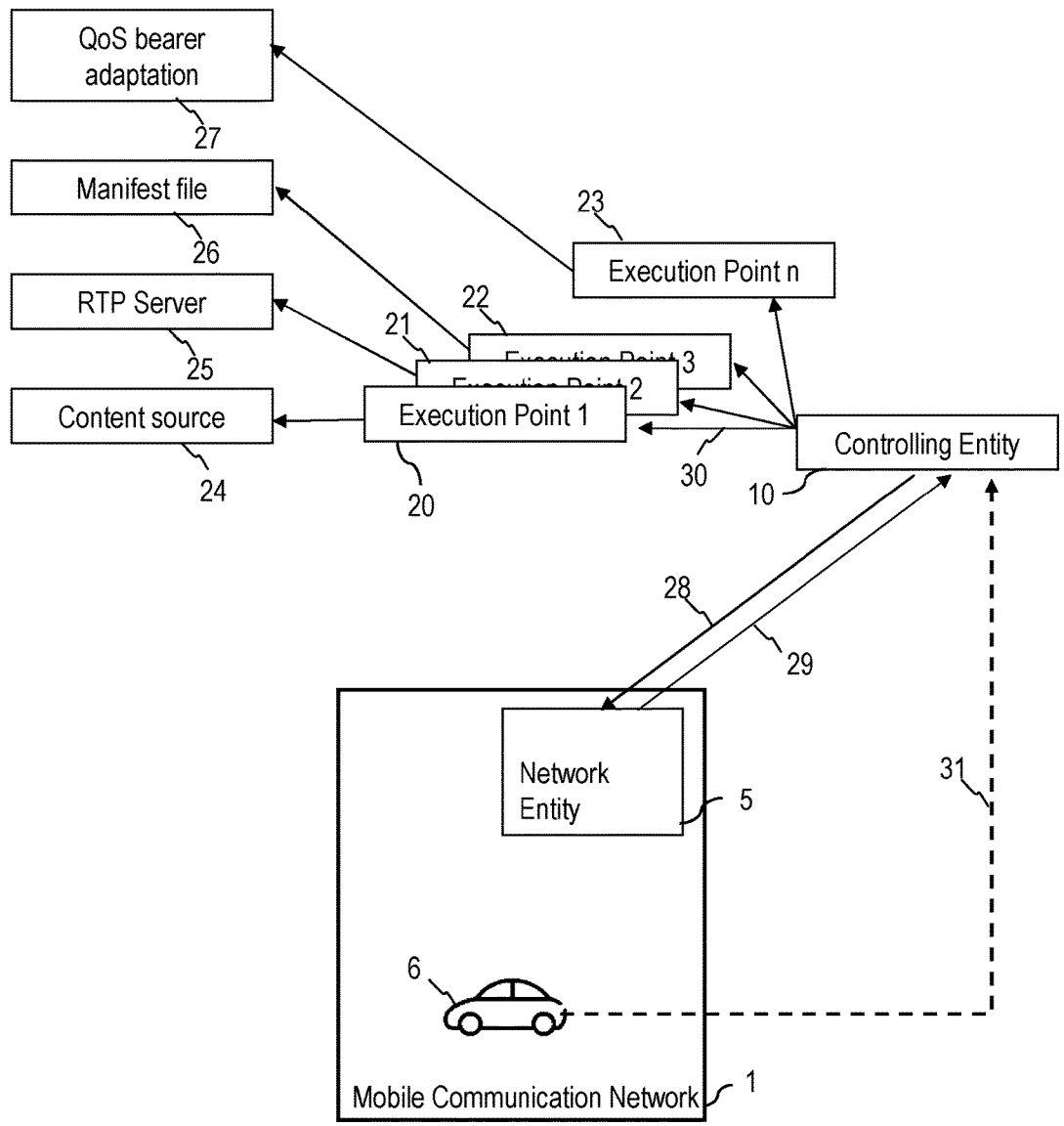
FIG. 2 is a block diagram of a system operative in accordance with embodiments.

FIG. 2 illustrates in greater detail a system in which methods and devices of embodiments are used to control content delivery. Content is delivered to a client 6 of a mobile communication network 1. A controlling entity 10 interfaces with a network entity 5 of the mobile communication network. The controlling entity 10 uses information provided by the network entity 5 to control content delivery. The controlling entity 10 may take one or plural different measures to relieve the data transmission associated with the content delivery over the RAN, of the mobile communication network 1.

The network entity 5 may be a dedicated computing device operated by the operator of the mobile communication network 1, in order to evaluate geo information of clients based on rules received from the controlling entity 10. For illustration, the network entity 5 may be a computing device which interfaces with a geo messaging server to retrieve information on locations of clients from the geo messaging server. Alternatively, the network entity 5 which evaluates geo information of plural clients may have additional functionalities. For illustration, the network entity 5 may be a geo messaging server. In this case, the network entity 5 operating as geo messaging server which receives location updates from different clients as the clients move from one area to another area covered by the mobile communication network 1. For further illustration, the network entity 5 may be, or may interface with, any other location-aware node of the mobile communication network 1 which monitors geo information of plural clients. The geo information may, but does not need to include information on geographic coordinates. The geo information may have any one of a variety of formats. For illustration, the geo information may be indicative of a RAN cell in which the respective client is presently located. The geo information may also be more coarse-grained. For illustration, the geo information for each client may be indicative of an area, or several areas, in which the client is presently located. The areas may respectively cover plural RAN cells.

The network entity 5 has an interface to receive a rule 28 according to which the geo information is evaluated. The interface over which the rule 28 is received at the network entity 5 may be an application programming interface (API). The rule 28 may comprise one or plural thresholds which are used by the network entity 5 in a threshold comparison. More complex rules may be input into the network entity 5. Such rules may include monitoring the rate of change in numbers of clients located in the various areas, in addition to monitoring the number of clients that is located in the various areas at any given time. Using, for example, information on changes in the numbers of clients, congestion situations in certain areas of the RAN may be predicted before they actually occur. The rules may depend on other or additional parameters, such as time of day. Thereby, variations in RAN loads which occur in different cells in a regular manner (e.g. as a function of time of day) may be taken into account.

The network entity 5 collects geo information on plural clients to evaluate the rule based thereon. Based on the evaluation of the geo information using the rule 28, the network entity 5 may output a message 29 notifying the controlling entity 10 that a certain condition has occurred. As will be explained in more detail, the message 29 may indicate that a number or density of clients located in a certain region exceeds a threshold. The message 29 may also indicate that the number or density of clients located in a certain region is likely to exceed a threshold in the future. The message 29 may also indicate that the number or density of clients falls below another threshold, or is likely to fall below the other threshold in the future. The message 29 may be location-specific in the sense that it may be indicative of the region in which the rule 28 has been satisfied. The message 29 may include an identifier for this region and/or identifiers for clients located in the respective region. In some implementations, the controlling entity 10 may use this information to adapt the content delivery in a location-specific manner, such that clients located in the region are affected by the adaptation, while clients located in other regions may not be affected.

In response to receiving the message 29, the controlling entity 10 may generate one control message or several control messages 30. The control message(s) 30 may be transmitted to any one, or any combination, of different execution points at which the adaptation of the content delivery is implemented.

The controlling entity 10 may control an execution point 20 to implement an adaptation of content delivery. The execution point 20 may be, or may be coupled to, a HTTP streaming server, for example. A bit rate at which a content source outputs content for a client located in a specific region may be adapted. Alternatively or additionally, subscription types of different clients may be taken into account. For illustration, the bit rate may be selectively adapted for content delivery to clients which have a basic subscription. Alternatively or additionally, agreements between service providers which offer the content delivery and the operator of the mobile communication network 1 may be taken into account. For illustration, the adaptation may be done selectively based on how much of an agreed data volume a service provider has already used.

Adapting the bit rate at which a content source outputs content for certain clients may be attained in various ways. For illustration, the execution point 20 may be a server which redirects streaming requests or other requests for content to different files which correspond to different bit rates. The execution point 20 may be provided with identifiers for the affected clients, e.g. with Internet Protocol (IP) addresses of these clients. The controlling entity 10 then implements a filtering at the IP level, which selectively causes certain clients to receive content from a content source associated with a given bit rate. For further illustration, the execution point 20 may be a content source 24 which emulates plural virtual content servers to provide the content at different bit rates. While different bit rates may be on a per client level, the adaptation is performed in a coordinated manner with the mobile communication network 1. The conditions in the mobile communication network 1 may thus be taken into account more in a more complete manner, as compared to cases where the content delivery to a given client is adapted based only on a measurement of the RAN condition performed by that very client.

Alternatively or additionally, the controlling entity 10 may control a second execution point 21 to implement an adaptation of content delivery. The second execution point 21 may be, or may be coupled to, a Real-Time Transport Protocol (RTP) server 25. Such an adaptation may be performed by instructing clients to use tags in their requests for content. If the RAN in a region is likely to become congested, all or some of the clients located in that region may be instructed to include a tag in their requests. The second execution point 21 may redirect requests received from clients, based on the tag, to one of plural different content sources which provide the requested content at different bit rates. In such an implementation, the controlling entity 10 filters, or redirects, the requests from different clients at the application level.

Alternatively or additionally, the controlling entity 10 may control a third execution point 22 to implement an adaptation of content delivery. The third execution point 22 may be, or may be coupled to, a server which transmits a manifest file. Such a manifest file may be used in streaming. The manifest file includes address information of the content source from which the content may be received. A manifest file which is modified such that it includes the address of another content source that provides the requested content, but at a different streaming bit rate, may be transmitted to selected clients. Such a modified manifest file may be sent to some, or all, of the clients located in a region in which the RAN is likely to become congested.

Alternatively or additionally, the controlling entity 10 may control a fourth execution point 23 to adapt the content delivery. In this case, a Quality of Service (QoS) bearer adaptation 27 may be performed. The fourth execution point 23 may interface with the mobile communication network 1 to cause the QoS bearer to be adapted. The QoS bearer may be adapted selectively for some clients. For illustration, the QoS bearer may be adapted for some, or all, of the clients located in a region in which the RAN is likely to become congested.

For each one of the various ways to adapt the content delivery, clients for which the content delivery is to be adapted may be identified based on the geo information for clients of the mobile communication network. Additional information may be taken into account when deciding how and to which extent the control delivery is to be adapted. For illustration, a decision on whether the content delivery bit rate for a given client is to be adapted, and the new value to which it is to be set, may additionally be based on the subscription type(s) of clients located in the affected region and/or on data budgets agreed between the service provider for the respective content delivery and the operator of the mobile communication network 1.

The client 6 to which the content is delivered provides a QoE report 31. The QoE report 31 may be automatically generated and transmitted by the client 6. Based on the QoE report 31, the controlling entity 10 may modify the rule which is used to evaluate the geo information for plural clients. The modified rule may be provided to the network entity 5. For illustration, if the rule involves a threshold comparison at which a change in bit rate is initiated, the threshold may be shifted based on QoE reports 31 received from different clients.

Figure 3:
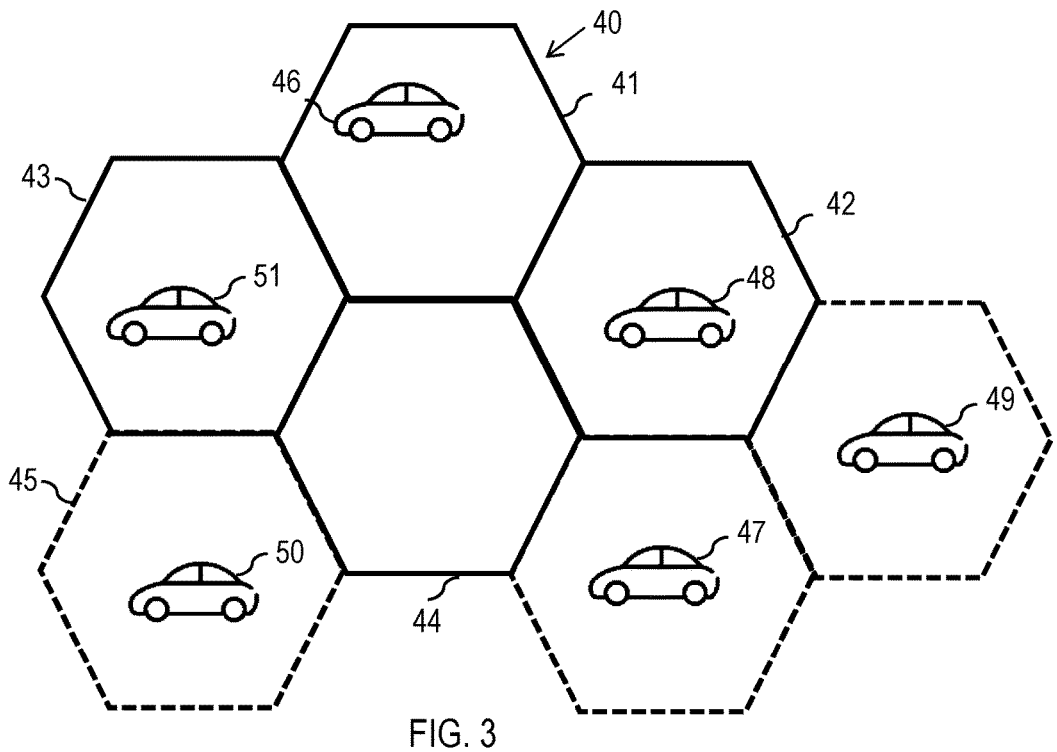
FIGS. 3 and 4 schematically illustrate content delivery control based on geo information of plural clients in accordance with embodiments.
Figure 4:
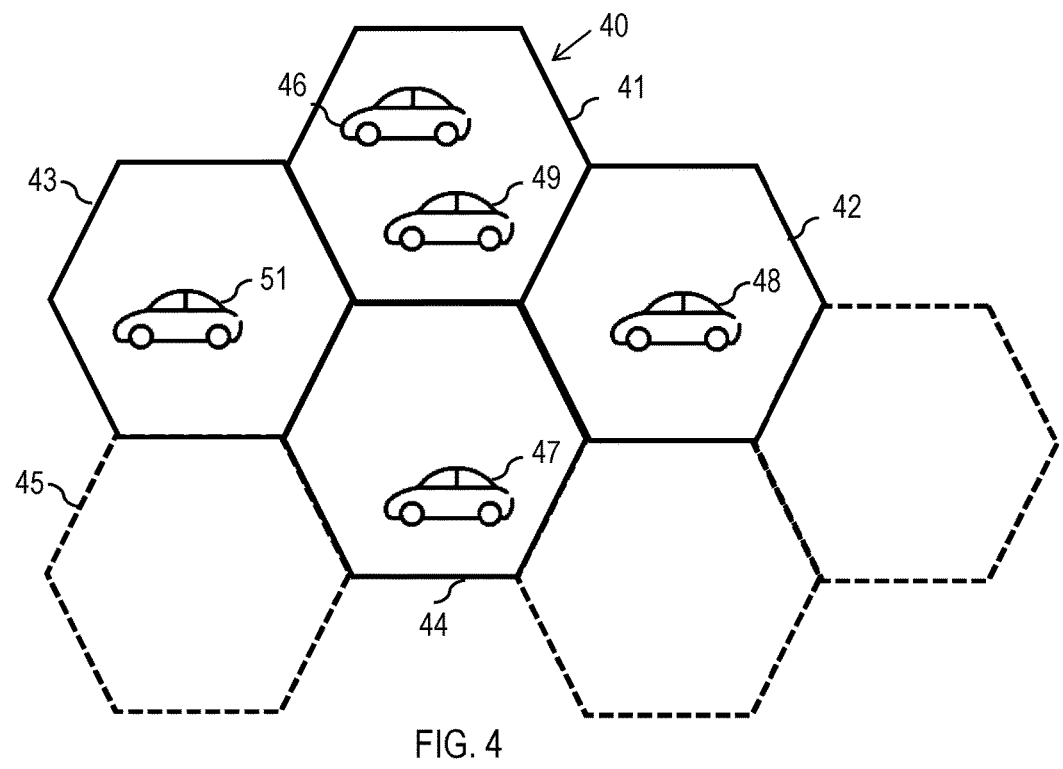

FIGS. 3 and 4 illustrate areas covered by a mobile communication network. The mobile communication network includes plural RAN cells 41-45. A geo-messaging area 40 may be defined as union of plural RAN cells 41-45. The geo-messaging area 40 may be a region used for geo messaging, for example. The geo-messaging area 40 may include plural RAN cells 41-44. When a client enters or leaves a geo-messaging area, such as geo-messaging area 40, a geo messaging server is notified thereof. Such information may be used as geo information when controlling content delivery. While geo-messaging areas defined for geo-messaging in the mobile communication network may be used to identify geo information of clients, any other geo information may also be used to identify a region where the RAN is to be relieved.

FIG. 3 illustrates a state in which three clients 46, 48, 51 are located within the geo-messaging area 40. Clients may enter or leave the geo-messaging area 40. Other clients 47, 49, 50 are initially located in other RAN cells. FIG. 4 illustrates a state in which the number of clients located in the geo-messaging area 40 has increased. Clients 47, 48 have moved into the geo-messaging area 40. The risk that the RAN in cells 41-44 becomes overloaded increases with an increasing number of clients located in the geo-messaging area 40. By monitoring the number, or density, of clients in the geo-messaging area 40 over time, the network entity 5 may determine whether the number, or density, exceeds a threshold. The threshold may be selected to correspond to a number, or density, of clients at which the RAN cells 41-44 are not yet overloaded, when using the current content delivery setting. A potential congestion situation may be anticipated before it occurs. This allows a graceful degradation of the content delivery to be implemented, before a congestion situation in the RAN severely impacts the quality of experience. The RAN in cells 41-44 may be relieved by adapting content delivery, such that the congestion situation is less likely to occur.

When an adaptation in content delivery is made to relieve the RAN, the adaptation may be made selectively for certain clients. For illustration, in response to determining that the number or density of clients in the geo-messaging area 40 reaches or exceeds a threshold, the content delivery may be selectively adapted for some, or all, of the clients 46-49, 51 located in the geo-messaging area 40 at that time. Different measures may be taken for different clients. For illustration, it is possible to account of the fact that the clients 46-49, 51 located in the geo-messaging region 40 may have different subscription types for the content delivery and/or that different service providers may have different agreements with the operator of the mobile communication network 1. The content delivery may first be degraded for clients having a basic subscription, for example.

Figure 5:
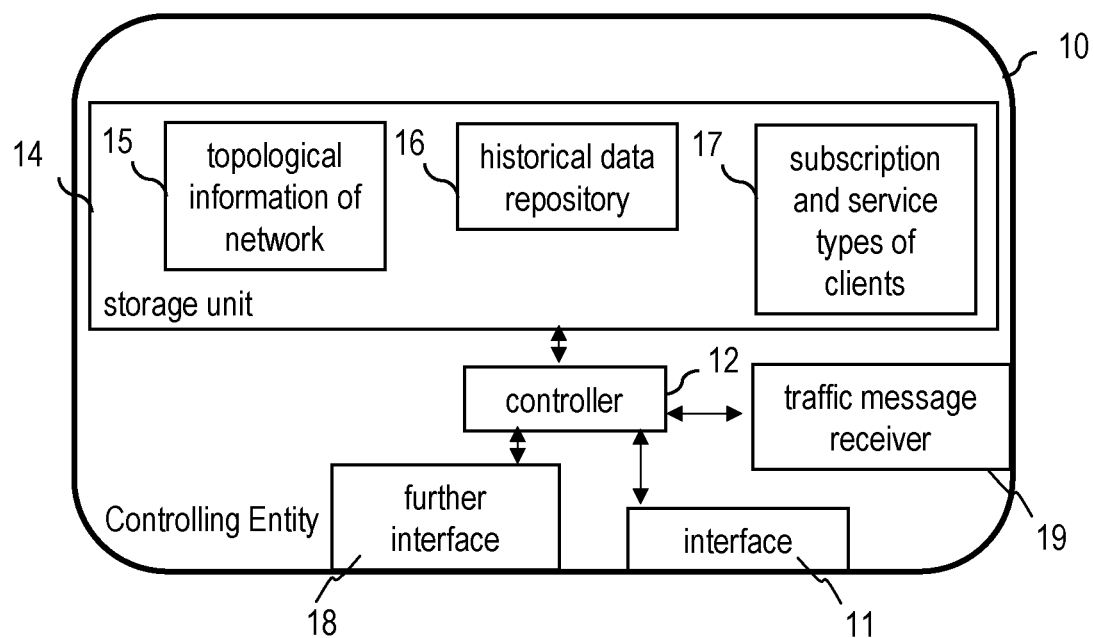
FIG. 5 is a block diagram of a controlling entity of an embodiment.

FIG. 5 is a block diagram representation of a controlling entity 10. The controlling entity 10 may be used in the systems of FIGS. 1 and 2, for example, in order to control content delivery to clients of a mobile communication network. The controlling entity 10 may be a server. In operation, the controlling entity 10 may be located outside the mobile communication network. The controlling entity 10 may be located in the backend, e.g. in the backbone of a wide area network such as the internet.

The controlling entity 10 generally comprises an interface 11 and a controller 12 coupled thereto. The controller 12 may comprise one or several processors which execute computer-executable instruction code to perform the various procedures described herein. When the controlling entity 10 is used in a system to control content delivery, the interface 11 is used for communication with a network entity of the mobile communication network. A rule may be output to the network entity of the mobile communication network over the interface 11, thereby programming the network entity to evaluate geo information of plural clients in accordance with the rule. A message from the network entity may be received at the interface 11. While illustrated as a functional unit in FIG. 5, the interface 11 may include separate interface units for outputting the rule to the network entity and for receiving a message from the network entity. The controlling entity 10 comprises a further interface 18 for outputting a control message, to thereby effect adaptation of the content delivery. While the further interface 18 may be a separate functional unit different from the interface 11, the functions of the interface 11 and of the further interface 18 may be performed by one physical interface unit. The controller 12 is configured to determine, based on the message received at the interface 11, how the content delivery is to be adapted in a location-dependent manner. The controller 12 may process the message received from the network entity. The message may contain identifier for a region in which the RAN is congested or may become congested unless counter-measures are taken. Additionally or alternatively, the message may include an identifier for clients located in a region in which the RAN is congested or may become congested unless counter-measures are taken. The controller 12 may generate the control message based on this information and may output the control message via the further interface 18.

As already described above, the controlling entity 10 may be configured to control adaptation of the content delivery in any one of a variety of ways.

For illustration, the controller 12 may generate a control message and may output the control message to a server which processes requests for content, such as a HTTP server. The controller 12 may generate the control message such that it includes identifiers for clients located in an affected region. It is not required that the identifiers for all clients located in the affected region be included in the control message. For illustration, if a selective adaptation of the content delivery is performed based on service levels of different clients, the controller 12 may generate the control message such that it include identifiers of a sub-set of the clients located in the affected region, the sub-set being selected based on the subscription levels. The control message may include information on maximum content delivery rates which may be used by the various clients. In response to receiving the control message, the server which processes requests for content delivery may redirect requests to one of plural different streaming servers, based on the identifier of the requesting client. The different streaming servers may be virtual servers. Each one of the different streaming servers may respectively store a sequence of files representing the content, which are sequentially delivered to the clients. The sequences of files may correspond to different streaming rates. The controlling entity thus causes a redirection of requests from different clients located in the affected region to one of the plural different streaming servers, thereby causing an adaptation in the content delivery. The client identifiers which are received at the interface 11 and which are used to redirect requests coming from these clients located in an affected region may include internet protocol (IP) addresses of these clients.

Alternatively or additionally, the controller 12 may generate another control message such that it includes one or plural tags, each tag being respectively transmitted in association with a corresponding maximum bit rate at which content may be delivered to a client having the respective tag. The tag is a data piece which is used to redirect requests. There may be one tag for maximum bit rate, and another tag for another maximum bit rate. The controlling entity 10 may output such another control message to a server, for example to a streaming server, which redirects requests for content that include a tag to one of plural different streaming servers, based on the tag. For illustration, the controlling entity 10 may output this other control message which includes tags and associated maximum bit rates to an RTP server. The controlling entity 10 may transmit a control message to instruct clients located in the affected region to include the tag in forthcoming requests for content. The controlling entity 10 may cause a server in the mobile communication network to transmit client control messages including the tag to clients located in the affected region. The clients which receive the client control messages may add the tag to their requests for content, until they receive another client control message which includes another tag or which indicates that the tag does no longer need to be used. It is not required that identifiers of clients located in the affected region be provided to the controlling entity 10 in such a solution. Privacy may thus be enhanced.

Alternatively or additionally, the controller 12 may generate a control message to adapt a Quality of Service (QoS) bearer in the mobile communication network. The controller 12 may generate the control message informing a bearer manager in the mobile communication network of the modifications of guaranteed bit rates of QoS bearers. The control message may indicate an adaptation of the guaranteed bit rate, e.g. by reducing the guaranteed bit rate. The guaranteed bit rate may be adapted differently for different clients located in the affected region. Different clients may receive different treatment based on their subscription types to the respective content delivery service, for example.

Alternatively or additionally, the controller 12 may generate a control message which causes a modified manifest file to be transmitted to clients located in the affected region. To this end, the controller 12 may generate and transmit the control message to a service gateway which transmits a manifest file including information on a content source, such as an address of the content source from which data may be retrieved. The control message may include information on maximum bit rates for clients located in the affected region, and identifiers for the respective clients. The information on the maximum bit rate may include the address of one or more streaming servers which provide the same content at different bit rates, respectively associated with identifiers for clients located in the affected region. The service gateway is operative to transmit, in response to a request from a client, a manifest file which includes information on a content source. When the controlling entity 10 transmits the control message to the service gateway, the service gateway will send the modified manifest file which includes the address of a streaming server which provides the content at a reduced bit rate. The manifest file may be a manifest file according to the Dynamic Adaptive Streaming of HTTP (DASH), as defined for example in 3GPP TS 26.247 v. 10.0.0. The transmission of a modified manifest file may also be done in accordance with a proprietary streaming technology, such as Adobe Systems' HTTP Dynamic Streaming, Apple Inc.'s HTTP Live Streaming (HLS) and Microsoft's Smooth Streaming. It will be appreciated that, in accordance with embodiments, the modified manifest file is transmitted in coordination with the mobile communication network, rather than "over the top" of the mobile communication network.

The controlling entity 10 may implement combinations of the various procedures described above. For illustration, the controller 12 may transmit several control messages, so as to both cause a modified manifest file to be transmitted and requests for content to be selectively redirected based on the client's IP address. A client-based approach in which a modified manifest file is transmitted to clients located in the affected region may thus support the approaches which are implemented at the network side, such as redirecting requests to one of plural streaming servers based on filtering performed based on IP addresses.

In each one of the various procedures performed by the controlling entity 10 to adapt the content delivery, the controlling entity 10 may control the degree to which a bit rate is adapted. For illustration, the controlling entity 10 may receive a message which indicates that the actual number of clients located in a region has a value $n_{s,is}$. The controller 12 may calculate a maximum allowed bit rate, $b_{s,target}$, for clients located in that region as $$b_{s,target} < C_A / n_{s,is}, \quad (1)$$

where $C_A$ indicates the available capacity for the respective region.

Different target bit rates may be assigned to different clients located in the affected region. In this case, the controller 12 may set the target bit rates for the clients such that $$\Sigma_j (b_{s,target})_j < C_A. \quad (2)$$

Here, $(b_{s,target})_j$ denotes the maximum allowed bit rate for a client designated by index j located in the affected region, and the sum is computed over all indices j for clients located in the respective affected region. The bit rates may be assigned based on, for example, client subscription types. For illustration, the maximum allowed bit rate for clients which have a basic subscription may be decreased until equation (2) is fulfilled, while the maximum allowed bit rate for clients which have subscriptions other than the basic subscription may remain unaltered.

It will be appreciated that, although the bit rates may be assigned individually at a per client level, the content delivery is adapted based on the locations of plural clients. The bit rate set for one client will depend on how many other clients are located in the respective affected region, in which counter-measures are taken to prevent congestions of the RAN. While the bit rate may be assigned individually for each client, the location-based adaptation of the content delivery still takes into account the overall number or density of clients in the affected region.

In each one of the various procedures performed by the controlling entity 10 to adapt the content delivery, the controller 12 may take into account additional information when determining whether the content delivery is to be adapted for clients located in a region. For illustration, the controlling unit 10 may comprise a storage unit 14 coupled to the controller 12. The storage unit 14 may store any one or any combination of various kinds of information which may be utilized to determine whether the content delivery is to be adapted for clients located in a specific region.

For illustration, topological information 15 of the mobile communication network 15 may be stored in the storage unit 14. Such topological information may be used when evaluating whether the content delivery needs to be adapted, taking into account that clients may be moving to regions which have higher capacities for delivering content. Referring to the exemplary RAN cells of FIGS. 3 and 4, the topological information 15 may include information on the number of RAN cells 41-44 which make up a region 40 in which a congestion situation is anticipated to occur in the RAN.

Alternatively or additionally, a repository 16 of historical data may be stored in the storage unit 14. Such historical data may be statistical information, which may be collected in ongoing use of the controlling entity 10. The historical data may include long-term statistical information on regular congestions in certain regions. The storage unit 14 may also store information on the service and the subscription type of the various clients. This information may be used when performing a prioritization such that the bit rate for some clients is degraded to a lesser extent than the bit rate for other clients located in the same affected region.

The controlling unit 10 may also include additional interfaces for receiving yet other information that may be used when determining whether, and to what extent, content delivery is to be adapted. For illustration, when the clients are vehicles respectively equipped with an interface for communication with the wireless communication network, traffic information may be used when determining whether and to which extent the content delivery is to be adapted. The controlling entity 10 may include a traffic message receiver 19 for receiving traffic messages. The controller 12 may be coupled to the traffic message receiver 19 and may be configured to anticipate congestion situations in the RAN based on the received traffic information. For illustration, the controller 12 may combine the traffic messages received at the traffic message receiver 19 with information on regions in which the number or density of clients has already exceeded a threshold, in order to determine whether the number of clients in an adjacent region is likely to increase to a value at which the RAN in that region is prone to being congested. For further illustration, the controller 12 may anticipate that a congestion is likely to occur in a certain region if there is a traffic jam in that region, as indicated by the traffic message.

While the controlling entity 10 may take steps to relieve the RAN in certain regions based on geo information of clients, the controlling entity 10 does not need to have direct access to the geo information of all clients of the mobile communication network. The geo information of the clients may be monitored by a network entity. The controlling entity 10 may output one or several rules for evaluating the geo information of the clients via the interface 11 to the network entity. The rules may include a threshold to which the number of clients in a region is compared by the network entity. The rules may include plural thresholds to which the number of clients in a region is compared by the network entity. When either one of the thresholds is reached, the controlling entity 10 receives the message from the network entity at the interface 11. Thereby, the controlling entity is alerted of a situation in which the bit rate of the content delivery to clients in the respective region is to be adapted.

The controlling entity 10 may be configured to receive QoE reports from the clients. The controlling entity 10 may receive the QoE reports via the interface 11. Alternatively, the controlling entity may have a separate interface for receiving the QoE reports. The controller 12 may evaluate the QoE reports. Based on the QoE reports, the controller 12 may adapt the rules for evaluating geo information of clients. For illustration, if QoE reports show frequent disruptions of service, the rule for evaluating the geo information of the clients may be adapted. This may involve decreasing a threshold which triggers the degradation in content delivery. The new rule is then output to the network entity via the interface 11. This allows the controlling entity 10 to take steps to relieve the RAN even earlier. The evaluation of QoE reports and the associated adaptation of the rules may be done in a location-specific manner, based on the region from which QoE reports are received. By adapting the rules which are used for evaluating the geo information, a closed-loop control may be implemented in which the adaptation of the content delivery may be improved further.

Figure 6:
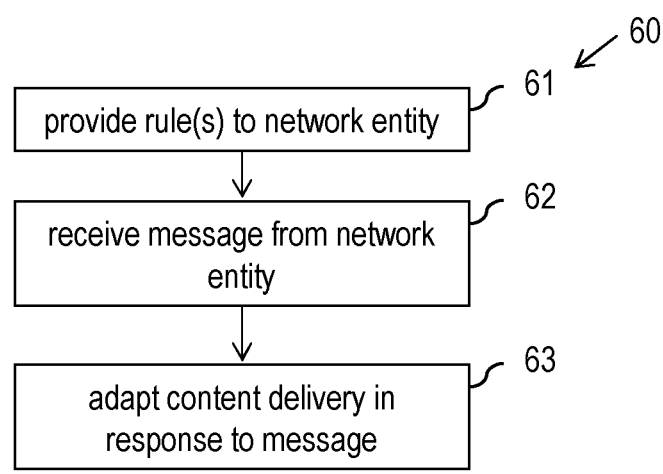
FIG. 6 is a flow diagram representing operation of the controlling entity in the method of an embodiment.

FIG. 6 is a flow chart of a procedure 60 which may be performed by the controlling entity 10, in order to control content delivery to clients of a mobile communication network.

At 61, a rule or several rules for evaluating geo information are output by the controlling entity 10. The rule(s) may be output to a network entity of the mobile communication network. The rule(s) may be output to the network entity in a message which is transmitted to configure the network entity to monitor the geo information of clients based on the rule(s) and to provide a message based on the evaluation. When the rule(s) are adapted in a closed-loop control, the rule(s) may be output to the network entity to re-configure the network entity such that it applies the rule(s) which have been modified based on QoE reports.

At 62, the controlling entity 10 receives a message from the network entity. The message, which is generated in dependence on a result of the evaluation of geo information of clients using the rule(s), may include an identifier for a region in which one of the rules is satisfied. The identifier for the region may be an identifier for a geo-messaging area, an identifier for a RAN cell, or similar. The message may alternatively or additionally include identifiers for clients located in that region. The identifiers for clients may include IP addresses of the clients, which are used for delivering the content to the clients.

At 63, in response to receiving the message, the controlling entity 10 adapts the content delivery. The adaptation may be performed in a location-dependent manner. The adaptation may include adapting bit rates at which content is delivered to clients located in the affected region. The adaptation may include computing a bit rate for content delivery to the clients located in the affected region, with the bit rate for at least one client being computed based on the number of other clients which are present in the same affected region. The controlling entity 10 may output a control message or plural control messages to selectively adjust the delivery of content to the plural clients located in the affected region.

The controlling entity 10 may perform any one of a variety of procedures to cause the bit rate of the content delivery to be adapted. For illustration, any one of the procedures described above may be used. When the message received at 62 includes identifiers for plural clients located in the affected region, the identifiers may be used to selectively relay requests for contents to one of plural different streaming servers which offer this content at different bit rates. Alternatively or additionally, transmission of tags and/or of a modified manifest file to the plural clients located in the affected region may be performed. Alternatively or additionally, the controlling entity 10 may output a control message to the mobile communication network to adjust guaranteed bit rates of QoS bearers. In some of the procedures which may be employed to relieve the RAN cells in the affected region, the controller 12 of the controlling entity may generate plural different control messages. For illustration, the controller 12 may generate one control message to effect transmission of tags or modified manifest files to clients located in the affected region. The controller 12 may generate another control message to configure a HTTP streaming server, a RTP server, a streaming gateway server or another server which receives request for content delivery such that requests for content are selectively relayed to one of plural different streaming servers.

The procedure 60 may include additional steps. For illustration, QoE reports may be received. The rule(s) may be automatically adapted based on the QoE reports. Adapting the rules may include adjusting threshold(s) to which a number or density of clients are compared. The procedure may then return to 61. For further illustration, the procedure 60 may include a step of updating historical data stored in a storage unit, based on message(s) received from the network entity. Thereby, reliability of the historical data may be enhanced and the amount of data upon which the historical data is based may be increased in ongoing operation of the controlling entity.

Figure 7:
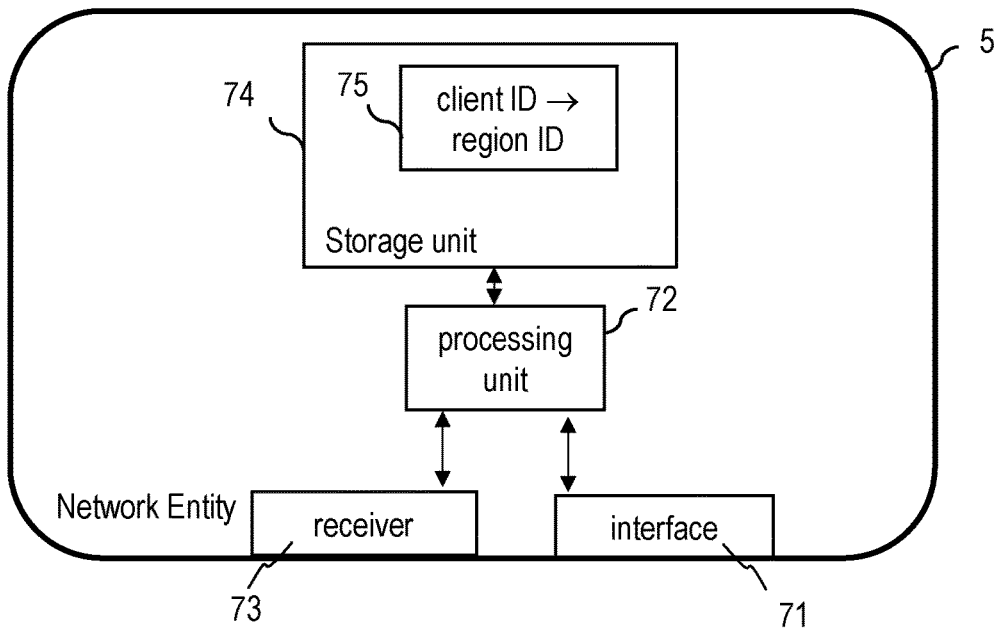
FIG. 7 is a block diagram of a network entity of an embodiment.

FIG. 7 is a block diagram representation of a network entity 5. The network entity 5 may be used in the systems of FIGS. 1 and 2, for example, in order to control content delivery to clients of a mobile communication network. The network entity 5 may be operated by the operator of the mobile communication network. The network entity 5 may also perform additional functions, such as geo-messaging functions. Alternatively, the network entity 5 may be coupled to a geo-messaging server or another node of the mobile communication network which collects geo information of clients.

The network entity 5 comprises an interface 71, a processing unit 72 and a receiver 73. The interface 71 may be a programming interface, e.g. an API. The receiver 73 may be an interface configured for communication with another node of the mobile communication network. The processing unit 72, which may include one or several processors or dedicated circuits, is coupled to the interface 71 and to the receiver 73.

Geo information of plural clients of the mobile communication network is received at the receiver 73. The geo information may be actively reported by the plural clients, for example when the network entity 5 also servers as a geo messaging server. The network entity may also query another node of the mobile communication network to receive the geo information of the plural clients at the receiver 73. The processing unit 72 evaluates the received geo information based on a rule or based on plural rules. The processing unit 72 may perform additional processing on the received geo information. For illustration, the processing unit 72 may be configured to update a data base 75 stored in a storage unit 74 based on the received geo information. The data base 75 may define a mapping between clients and regions. For illustration, if the geo information indicates that a client has traversed a boundary between geo messaging areas, the processing unit 72 may update the data base 75 accordingly.

The geo information received at the receiver 73 may have any one of a variety of formats. For illustration, the geo information may include an identifier for a RAN cell in which the respective client is located. The geo information may alternatively or additionally include an identifier for a geo messaging area, which may cover more than one RAN cell. The geo information may alternatively or additionally include geo coordinates.

The rule(s) which are used by the processing unit 72 may be injected via the interface 71. In operation, the rule(s) may be injected from a controlling entity which is located outside the mobile communication network. For illustration, in some implementations, one threshold or at least two thresholds may be provided to the network entity 5 via the interface 71. The network entity 5 may respectively compare, for each one of plural different regions, the number of clients to the threshold(s). Different threshold(s) may be injected for different regions, e.g. for different geo messaging areas. The rule(s) may be more complex. For illustration, the rule(s) may include a criterion for outputting a message which is not only based on the present number of clients in a region, but which is also based on a rate of change of that number. The rule(s) may include an executable instruction code which is executed by the processing unit 71 to evaluate the geo information of the clients. The rule(s) may include parameters for an executable instruction code which is stored in the network entity 5. In the latter case, the controlling entity may configure the network entity such that it performs a pre-defined procedure to evaluate the geo information of the plural clients, while using the parameters injected by the controlling entity. The parameters may include one or plural threshold(s) to which the number of clients in a region is compared.

The processing unit 72 is configured to evaluate the geo information of the plural clients based on the rule(s) received at the interface 71. For illustration, the processing unit 72 may determine the number of clients respectively located in each one of plural different areas covered by the mobile communication network. The processing unit 72 may compare this number to an associated threshold, or to a pair of associated threshold. The processing unit 72 may be configured to predict a region which is affected by a congestion situation, now or in the future, by evaluating the geo information of the plural clients based on the rule(s). Based on a result of the threshold comparison, the processing unit 72 may selectively generate a message and may output the message to the controlling entity. The message may be output over the interface 71. For illustration, a message may be generated and output when a number of clients of the mobile communication network located in an area exceeds a first threshold. Another message may be generated and output when a number of clients of the mobile communication network located in an area falls below a second threshold. The controlling entity is thereby informed that, based on the rules previously injected, a state is reached in which measures are to be taken to avoid a congestion in the RAN in an identified region. Alternatively, the controlling entity may be informed that such measures to adapt the content delivery in a location-specific manner which have previously been taken may be relieved, because the number of clients in that region has decreased sufficiently that there is a smaller risk of congestion in the RAN occurring even if content is delivered to the clients at higher bit rates. The message may be an alert, generated and transmitted to inform the controlling entity that content delivery should be adapted in a location-specific manner.

The evaluation of the geo information based on the rule(s) includes identifying the region for which the content delivery is to be adapted. This may be done in various ways. For illustration, the processing unit 72 may determine an identifier for the region in which the content delivery is to be adapted. The processing unit 72 may be configured to output such an identifier for the affected region in the message transmitted to the network entity. Alternatively, the processing unit 72 may determine identifiers for clients located in the region in which the content delivery is to be adapted. The processing unit 72 may access a storage unit 74 to determine clients located in the region, using a data base 75 which specifies the region in which a client is located for plural client identifiers. The client identifiers may, for example, be IP addresses of the clients which are used when content is delivered to the clients. The client identifiers may also be other client identifiers, and the processing unit 72 may be configured to map the client identifiers onto associated IP addresses of the clients which are used when content is delivered to the clients.

The network entity 5 is operative to provide information on anticipated congestion situations in the RAN to the controlling entity located outside of the mobile communication network. Identifiers for the respective clients may, but do not need to be output to the controlling entity. For illustration, the processing unit 72 of the network entity 5 may selectively generate a message based on the evaluation of the geo information using the rule(s), the message including an identifier for the region in which the content delivery is to be adapted. Such information may be sufficient for the controlling entity to adapt content delivery in a location-selective manner. For illustration, when tags or modified manifest files are transmitted to clients located in the respective area, it may not be required for the controlling entity to be actually informed of identifiers for the clients. Enhanced privacy may thus be attained. In other implementations, the processing unit 72 of the network 5 entity may selectively generate a message based on the evaluation of the geo information using the rule(s), the message including identifiers for clients located in the region in which the content delivery is to be adapted. The controlling entity may use client identifiers included in the message to relay requests for content to one of plural different streaming servers based on the IP address of the requesting client. Alternatively or additionally, the controlling entity may use client identifiers included in the message to selectively configure a streaming gateway or streaming server such that a request for content is selectively directed to one of plural different streaming servers based on the IP address of the requesting client. The bit rate may thus be selectively adjusted for clients located in the affected region.

Figure 8:
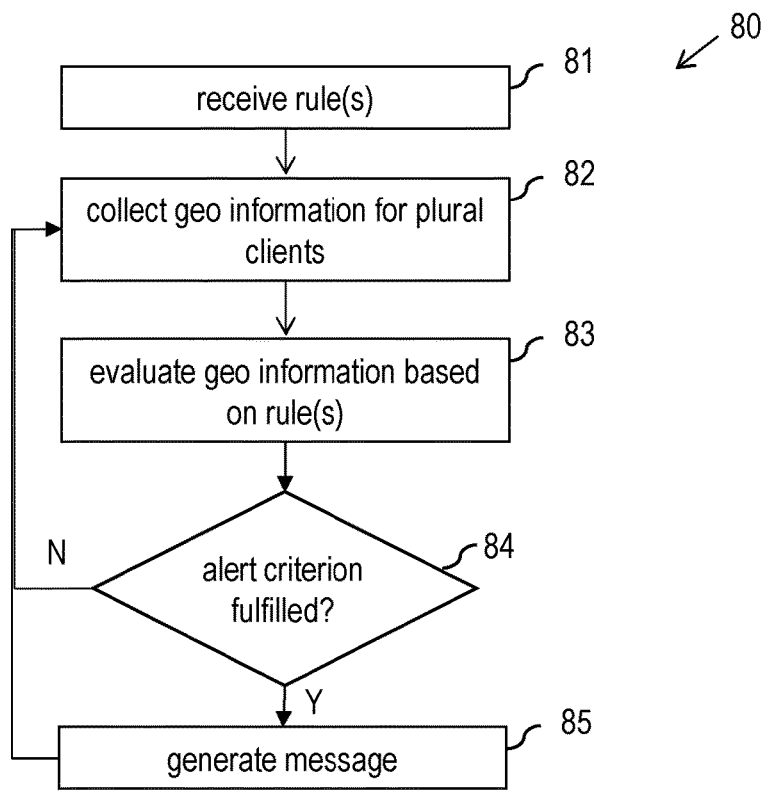
FIG. 8 is a flow diagram representing operation of the network entity in the method of an embodiment.

FIG. 8 is a flow chart of a procedure 80 which may be performed by the network entity 5, in order to inform a controlling entity that content delivery to clients of a mobile communication network is to be adapted At 81, a rule or several rules for evaluating geo information are received by the network entity 5. The rule(s) may be received from a controlling entity located outside of the mobile communication network. The rule(s) may be received in a message, which configures the network entity to monitor the geo information of clients based on the rule(s) and to provide a message based on the evaluation.

At 82, the network entity 5 collects geo information for plural clients of the mobile communication network. The geo information for the plural clients may be collected even before the rule(s) are received. The geo information for the plural clients may be collected using information transmitted by the clients to a geo messaging server. The geo information for the plural clients may be collected by querying a node of the mobile communication network which is aware of the location of the clients.

At 83, the geo information for the plural clients is evaluated based on the rule(s). As explained above, the rules may include threshold(s) which are used to evaluate the geo information. The evaluation of the geo information based on the rule may include determining respectively an indicator for a number of clients for each one of plural different regions. The evaluation of the geo information based on the rule may include comparing the indicator for the number of clients located in a region to a threshold. The evaluation of the geo information based on the rule may include comparing the indicator for the number of clients to both a first threshold and a second threshold. More complex evaluations may be performed. For illustration, not only the instant number of clients per region, but also the rate of change of the number of clients per region may respectively be evaluated for plural different regions. The evaluation may include predicting a region in which a congestion situation may occur in the RAN, based on the number of clients located in that region and, optionally, adjacent regions.

At 84, it is determined whether an alert criterion is fulfilled. The alert criterion may be fulfilled when the number of clients in a region reaches or exceeds an associated threshold. The alert criterion may be fulfilled when the number of clients in a region either one of exceeds a first threshold or falls below a second threshold. If the alert criterion is not fulfilled, the procedure returns to 82. If the alert criterion is fulfilled, the procedure continues at 85.

At 85, the processing unit 72 of the network entity 5 generates a message. The message is output to the controlling entity. The message may include an identifier for the region for which a congestion situation is predicted based on the evaluating at 84. The message may include identifiers of clients which are located in the region for which a congestion situation is predicted. The procedure then returns to 82.

If new rule(s) are received by the network entity, the procedure may return to 81. The evaluation of the geo information is then continued using the new rules.

With reference to FIGS. 9-12, signal flows in methods of controlling content delivery and corresponding systems according to embodiments will be explained. Devices or messages already explained in the context of FIGS. 1-8 are designated with the same reference numerals.

Figure 9:
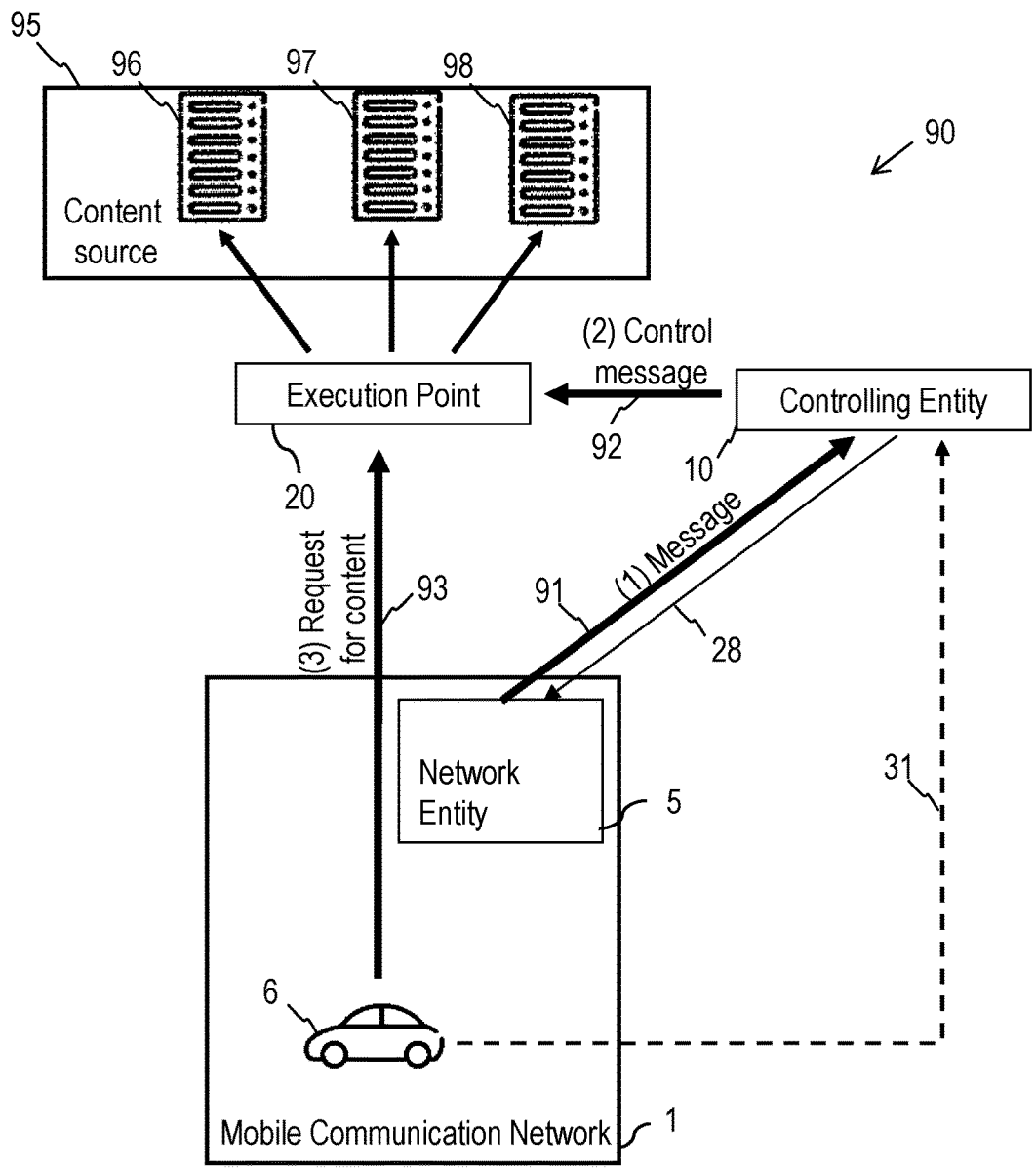
FIG. 9 is a block diagram of a system illustrating a signal flow in accordance with embodiments.

FIG. 9 is a block diagram of a system illustrating a signal flow in accordance with embodiments. The controlling entity 10 controls an execution point 20 which relays or redirects requests for content to one of plural different streaming servers based on IP addresses of the requesting clients. The execution point 20 may be any server which receives requests for content, e.g. a HTTP server. The controlling entity 10 acts as a decision point operative to filter requests for content based on IP addresses, causing the requests for content to be selectively redirected to one of plural different streaming servers.

The controlling entity 10 transmits one or several rule(s) 28 to the network entity 5. The network entity 5 collects geo information of plural clients to which content is delivered, and evaluates the collected geo information based on the rule(s) 28. Based on a result of the evaluation, a message 91 is transmitted to the controlling entity 10. The message 91 includes identifiers of clients which are located in an affected region. The message 91 may be transmitted before the RAN in the affected region becomes congested. The congestion situation may be anticipated using geo information of the clients.

Receipt of the message 91 triggers the controlling entity 10 to decide whether the content delivery to at least some of the clients located in the affected region is to be adapted, and for which clients located in the affected region the content delivery is to be adapted. For illustration, the controlling entity 10 may assign target bit rates to clients located in the affected region in accordance with one of Equations (1) and (2). The controlling entity 10 transmits a control message 92 to the execution point 20. The control message 92 may include identifiers for the clients located in the affected region and the associated target bit rates. It is not required that identifiers for all clients located in the affected region be included in the control message 92. If the controlling entity 10 decides that content delivery is to be degraded for only a sub-set of the clients located in the affected region, the control message 92 may be generated to include only the identifiers for these clients and the associated target bit rates. Using the control message 92, the controlling entity 10 configures the execution point 20 such that requests for content are selectively relayed or redirected to one of plural streaming servers 96-98, depending on the IP address of the requesting client. The execution point 20 may store the IP addresses of the clients and associated target bit rates for subsequent processing of requests.

The content source 95 may include the streaming servers 96-98. The streaming servers 96-98 do not need to be physically different entities. The streaming servers 96-98 may be implemented by one physical server which is configured to provide the same content at different streaming rates. If the content source 95 is configured to only provide content at a given, pre-defined bit rate, the controlling entity 10 or execution point 20 may send another control message to the content source 95, thereby requesting that the content be provided at plural different bit rates. Corresponding virtual streaming servers may be set up in the content source 95 in response to such a request.

When a client 6 transmits a request 93 for content, the execution point 20 determines the target bit rate for the client 6. The execution point 20 may select one of the plural streaming servers 96-98 based on the target bit rate for the client 6. For illustration, the execution point 20 may select one of the plural streaming servers 96-98 which offers the content with a bit rate which is less than or equal to the target bit rate for this client. If there are plural such streaming servers 96-98, the streaming server which offers the content with the greatest bit rate less than or equal to the target bit rate may be selected. The execution point 20 relays or redirects the request to the corresponding streaming server 96-98.

Figure 10:
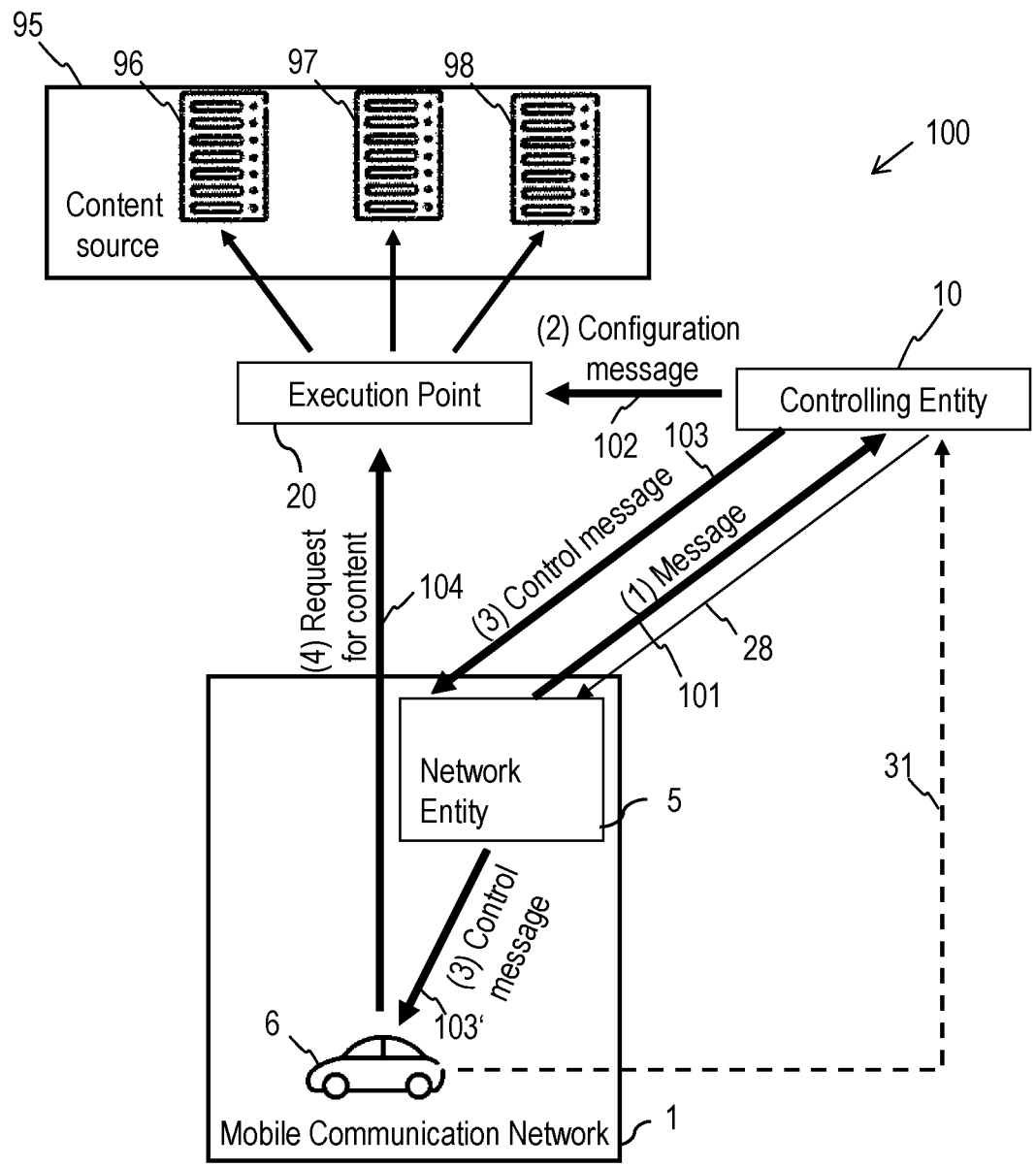
FIG. 10 is a block diagram of a system illustrating a signal flow in accordance with embodiments.

FIG. 10 is a block diagram of a system illustrating a signal flow in accordance with embodiments. The controlling entity 10 causes a control message 103' to be transmitted to all clients located in an affected area. This control message 103' may include a tag which the clients will include in their requests for content. The controlling entity 10 also controls an execution point 20 such that the execution point 20 redirects requests for content to one of plural streaming servers 96-98, based on the tag included in the respective request for content. The controlling entity 10 may act as a filter on the application level in this implementation.

The network entity 5 collects geo information of plural clients to which content is delivered, and evaluates the collected geo information based on the rule(s) 28. Based on a result of the evaluation, a message 101 is transmitted to the controlling entity 10. The message 101 may include an identifier for an affected region. The message 101 may further include information on a number of clients located in that region. However, as the rule(s) 28 have previously been set by the controlling entity 10, it is not required that the number of clients located in the affected region is indicated in the message 101. The controlling entity 10 may use information on previously output rule(s) to determine the number of clients in the affected region which has triggered transmission of the message 101. The message 101 may, but does not need to include identifiers of clients which are located in an affected region. The message 101 may be transmitted when a congestion situation in the RAN is predicted.

Receipt of the message 101 triggers the controlling entity 10 to decide whether the content delivery to clients located in the affected region is to be adapted. For illustration, the controlling entity 10 may assign a target bit rate to clients located in the affected region according to one of Equations (1) and (2). The controlling entity 10 transmits a configuration message 102 to the execution point 20. The execution point 20 may be any server which receives requests for content, e.g. a streaming gateway or an RTP server. The configuration message 102 includes information on a tag and an associated target bit rate. The execution point 20 is configured to redirect requests for content which include the tag to a streaming server 96-98 which offers the content at a bit rate which best matches the target bit rate. For illustration, the execution point 20 may redirect requests for content to a streaming server which offers the content at a streaming rate which is less than the target bit rate, as indicated by the target bit rate assigned to the tag contained in the request.

Receipt of the message 101 also triggers controlling entity 10 to transmit a control message with the tag to the clients which are located in the affected region. The controlling entity 10 may transmit a control message 103 including the tag to the network entity 5. The network entity may relay this control message 103 as control message 103' to the clients located in the affected region. In other implementations, the controlling entity 10 may issue the control message 103 with the tag to a node of the mobile communication network 1 which is different from the network entity 5. This other node may then transmit the tag to the clients located in the affected region. Geo-messaging techniques may be used to transmit the tag to the clients located in the affected region.

When a client 6 transmits a request 104 for content, the tag is included in the request 104. The execution point 20 determines the target bit rate for the client 6 based on the tag, using the information included in the configuration message 102. The execution point 20 may select one of the plural streaming servers 96-98 based on the target bit rate for the client 6. For illustration, the execution point 20 may select one of the plural streaming servers 96-98 which offers the content with a bit rate which is less than or equal to the target bit rate for this client. If there are plural such streaming servers 96-98, the streaming server which offers the content with the greatest bit rate which is still less than or equal to the target bit rate may be selected. The execution point 20 relays or redirects the request to the corresponding streaming server 96-98.

Figure 11:
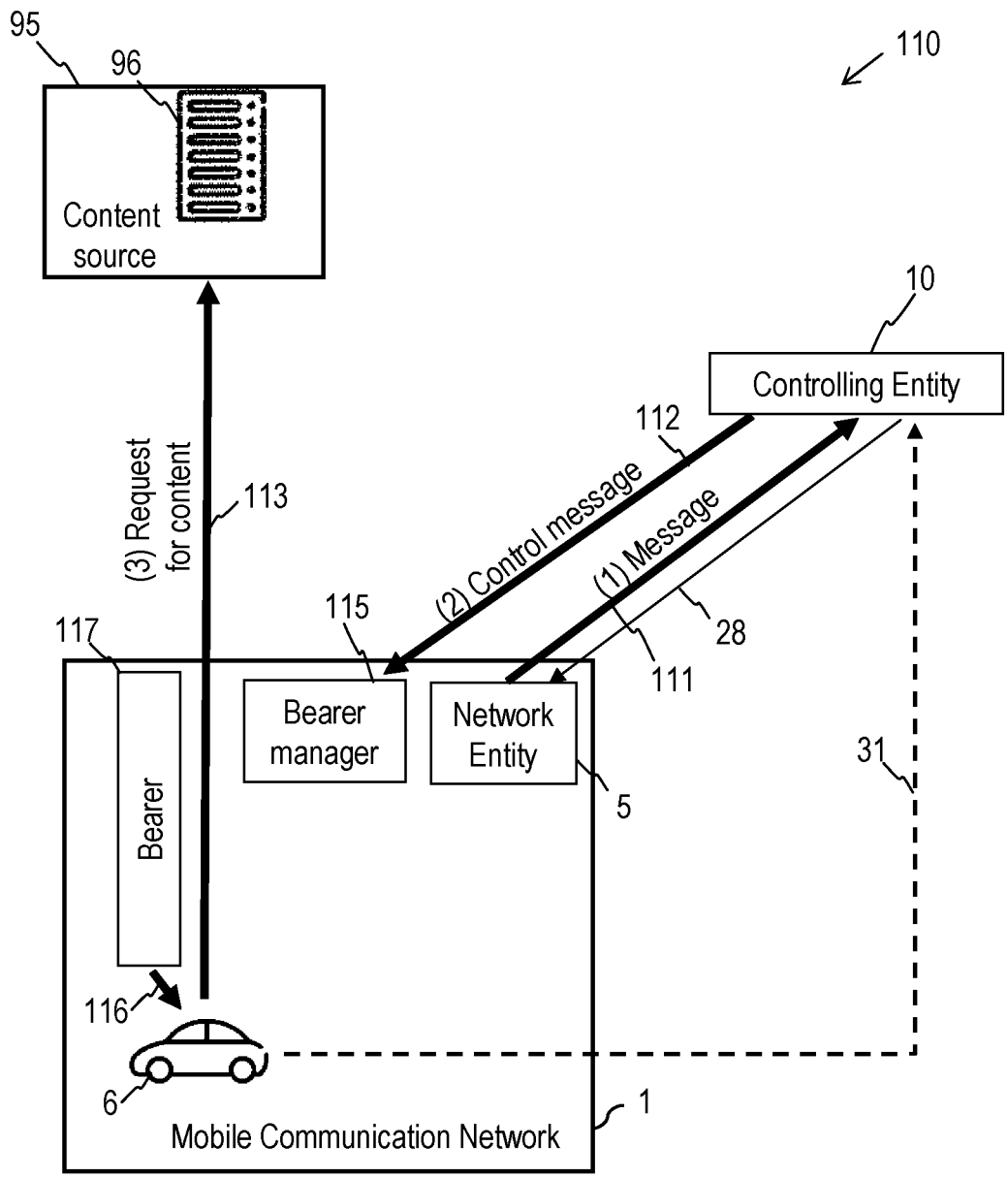
FIG. 11 is a block diagram of a system illustrating a signal flow in accordance with embodiments.

FIG. 11 is a block diagram of a system illustrating a signal flow in accordance with embodiments. The controlling entity 10 controls an execution point which is a bearer manager 115 of the mobile communication network 1. Thereby, the guaranteed bit rate may be adapted for QoS bearers which transport content to clients located in an affected region.

The controlling entity 10 transmits one or several rule(s) 28 to the network entity 5. The network entity 5 collects geo information of plural clients to which content is delivered, and evaluates the collected geo information based on the rule(s) 28. Based on a result of the evaluation, a message 111 is transmitted to the controlling entity. The message 111 includes identifiers of clients which are located in an affected region. The message 111 may be transmitted before the RAN in the affected region becomes congested. The congestion situation may be anticipated using geo information of the clients.

Receipt of the message 111 triggers the controlling entity 10 to decide whether the content delivery to at least some of the clients located in the affected region is to be adapted, and for which clients located in the affected region the content delivery is to be adapted. For illustration, the controlling entity 10 may assign target bit rates to clients located in the affected region according to one of Equations (1) and (2). The controlling entity 10 transmits a control message 112 to the bearer manager 115. The control message 112 may include identifiers for the clients located in the affected region and the associated target bit rates. It is not required that identifiers for all clients located in the affected region be included in the control message 112. The controlling entity 10 configures the bearer manager 115 such that the guaranteed bit rates for the QoS bearers are adapted. When content is delivered to a client 6, the guaranteed bit rate for the QoS bearer 117 through which the content is delivered may be set based on the control message 112. This leads to an adaptation of the bit rate of data transmission 116 to the client 6.

Embodiments of the invention are not limited to the signal flows explained with reference to FIGS. 9-11. For illustration, the controlling entity 10 may cause a manifest file to be modified and to be transmitted to clients located in an affected region of the mobile communication network 1. For further illustration, the various procedures may be combined with each other to control content delivery.

While only one mobile communication network 1 is illustrated in FIGS. 1, 2 and 9-11, the controlling entity 10 may interface with plural different mobile communication networks to control content delivery.

Figure 12:
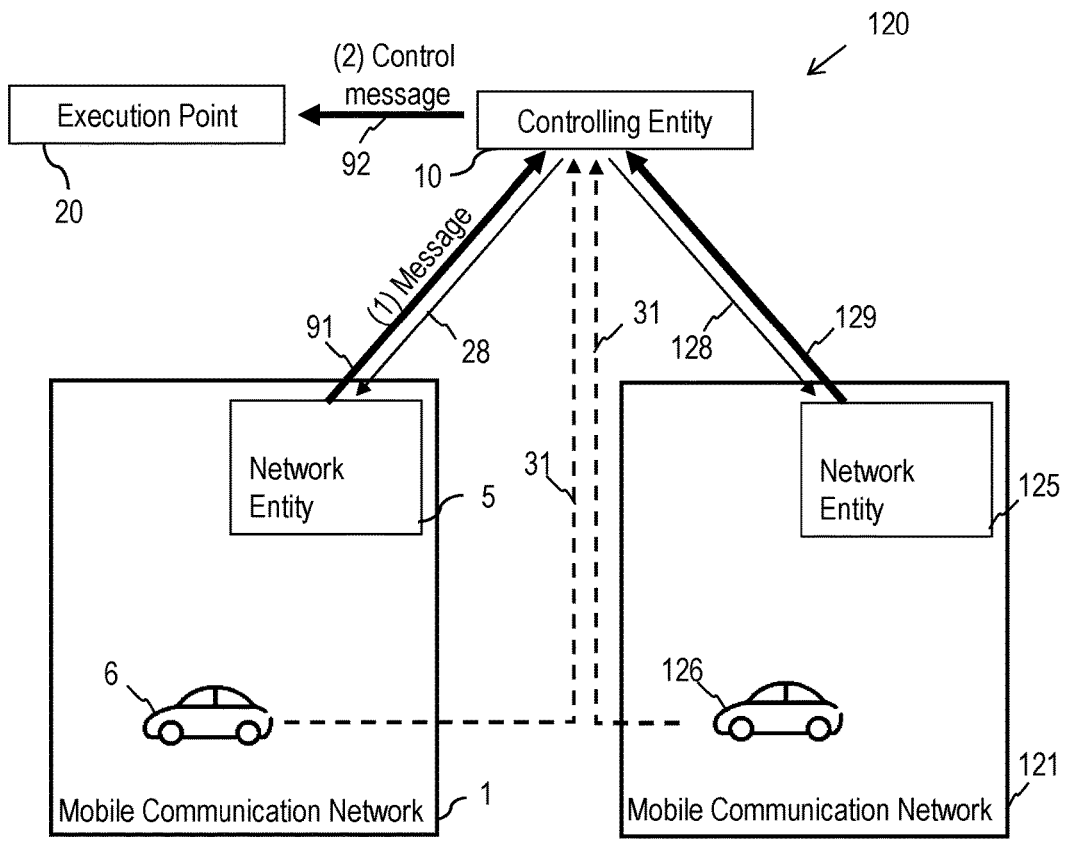
FIG. 12 is a block diagram of a system illustrating a signal flow in accordance with embodiments.

FIG. 12 illustrates a signal flow in methods and systems of an embodiment. The system includes plural mobile communication networks, which may include a first mobile communication network 1 and a second mobile communication network 121. Content delivery to clients of the first mobile communication network 1 may be controlled as explained with reference to any on of FIGS. 9-11, for example. Content delivery to clients 126 of the second mobile communication network 121 may be similarly controlled using the procedures and signal flows explained with reference to any on of FIGS. 9-11, for example.

The controlling entity 10 may inject rules 28 to the network entity 5 of the first mobile communication network 1, and may inject rules 128 to a network entity 125 of the second mobile communication network 121. The controlling entity 10 may select different rules for different mobile communication networks, i.e. for different operators. The rules may respectively be selected based on a service agreement between the service provider which offers the content delivered to clients and the operators of the first mobile communication network 1 and the second mobile communication network 121, respectively. The rules may respectively be selected based on data volumes which have already been used for delivering content over the first mobile communication network 1 and the second mobile communication network 121, respectively, as compared to agreed data volumes that may be used in a pre-defined time interval. For illustration, the controlling entity 10 may set different thresholds to which the number of clients in a certain region is to be compared for the first mobile communication network 1 and for the second mobile communication network 121.

In response to receiving a message 91 from the first mobile communication network 1 or in response to receiving a message 129 from the second mobile communication network 121, the controlling entity 10 may decide on how the content delivery is to be adapted and/or by how much the bit rates are to be adjusted. The controlling entity 10 controls an execution point 20 to effect the adaptation in content delivery.

Figure 13:
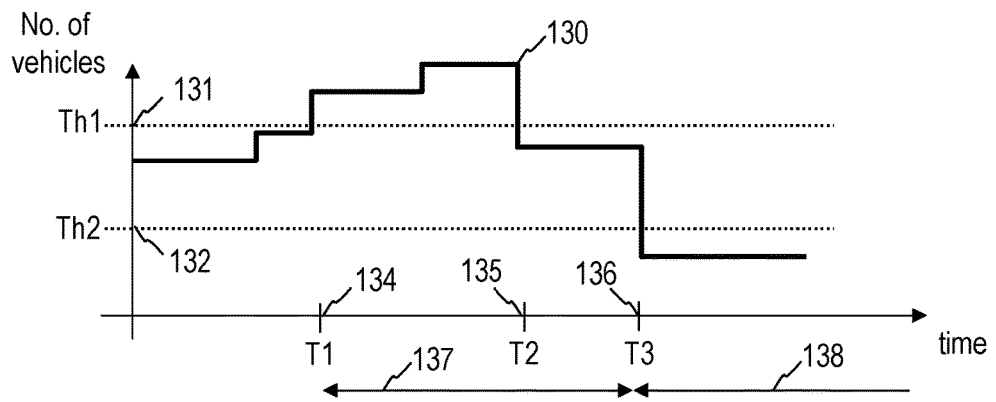
FIG. 13 is a schematic view illustrating adaptation of content delivery based on an indicator for a number of clients in accordance with embodiments.

FIG. 13 is a schematic view illustrating adaptation of content delivery based on a number or density of clients in accordance with embodiments. A spatially selective adaptation of the content delivery, e.g. a reduction or increase in bit rate, may be performed by monitoring an indicator for the number of clients in a region, respectively for plural different regions. The clients may be vehicles equipped with an interface for communication with the mobile communication network. The indicator may be the number of clients, the density of clients, or another quantity which is a monotonous function of the number of clients. The indicator 130 is shown as a function of time. The indicator 130 may be compared to a first threshold 131 and to a second threshold 132. The first threshold 131 and the second threshold 132 may be set by the controlling entity 10.

When the indicator 130 exceeds the first threshold 131 at a first time, T1, 134, the network entity of the respective mobile communication network may output a message to the controlling entity. This causes the controlling entity to take measures to relieve the RAN in the respective region. When the indicator 130 falls below the first threshold at a second time, T2, 135, it is not required that a message be output to the controlling entity, and the controlling entity does not need to take any action. When the indicator 130 exceeds the second threshold 132 at a third time, T3, 136, the network entity of the respective mobile communication network may output a message to the controlling entity. This causes the controlling entity to adapt the bit rates for clients located in the respective region such that content delivery at higher bit rates is again allowed. In response to the message transmitted at the first time T1, the controlling entity implements a bit rate reduction for clients located in the respective region at the first time T1. This degradation is continued for a period 137. Subsequent to the third time T3, the controlling entity takes measures which allow the content to be delivered again at higher bit rates. This reflects that the RAN is less likely to be congested in period 138.

Various effects may be attained using methods, devices and systems of embodiments. According to embodiments, the adaptation of the content delivery is coordinated with the mobile communication network. This allows a graceful adaptation of the content delivery when load peaks occur, e.g. due to a high vehicle density caused by a traffic jam. With the adaptation being performed in a location-specific manner for regions in which an overload situation is likely to occur, unnecessary degradation in other areas may be avoided. For clients located in the affected region, the adaptation of the content delivery may prevent disruptions of service or other severe negative impacts on the perceived quality.

For further illustration, when the adaptation of the content delivery is coordinated with the mobile communication network, contract frameworks between service providers and network operators may be taken into account. Such contract frameworks may foresee a limited amount of data to be transmitted, be it due to the data distribution agreement itself or to more sophisticated agreements such as selective prioritization of traffic. When there is a danger that the data volume could be exceeded, the service provider has the option to react to such a situation in a flexible way, e.g. by prioritization of clients based on their subscription. Enhanced versatility is attained as compared to approaches where rate adaptation is executed only at an individual session and user level. By considering the perspective of the content provider, an agreed capacity budget can be kept also in high load situation.

It is to be understood that the examples and embodiments as explained above are merely illustrative and susceptible to various modifications. For illustration, in each embodiment and aspect described herein, the clients may be vehicles. Methods, devices and systems of embodiments are not limited thereto and may also be used for other clients of mobile communication networks. For further illustration, in each embodiment and aspect described herein, the content delivery may be audio streaming. Methods, devices and systems of embodiments are not limited thereto and may also be used for video streaming, media streaming, multimedia streaming. The streaming may respectively be live streaming or on demand. Methods, devices and systems of embodiments may also be used when content is delivered by download. For further illustration, in each embodiment and aspect described herein, the controlling entity may be configured to perform plural different procedures to put the adaptation in content delivery into effect. The controlling entity may be configured to determine, in response to receiving a message from the network entity, which one of the different procedures or which combination of these different procedures should be used. For further illustration, in each embodiment and aspect described herein, the controlling entity may be a server outside of the mobile communication network. The controlling entity may be a dedicated server for controlling the functions described in the context of embodiments, but may also be integrated in other servers. For further illustration, in each embodiment and aspect described herein, the network entity may be configured to specifically monitor the geo information of clients to which a specific content is delivered, e.g. clients which receive a specific audio stream. However, in each embodiment and aspect described herein, the total number of clients located in a region may be used when performing the evaluation of geo information in the network entity. The total number of clients interested in content delivery will generally scale with the total number of clients, so that the total number of clients may be used when determining whether an adaptation of the content delivery is to be made. For further illustration, in each embodiment and aspect described herein, the network entity may be a server which is interfaced with a node of the mobile communication network. The network entity may be a geo cast server of a geo cast service, for example, or may be coupled to a geo cast server. The geo cast server may receive information on tiles of the geo cast service in which the clients are located. For further illustration, in each aspect and embodiment described herein, the controlling entity may be a dedicated server for controlling the functions described in the context of embodiments, but may also be integrated in other servers. For illustration, the controlling entity may be integrated into a gateway or server of the content provider which offers the content delivered to the clients. Further, it is to be understood that the above concepts may be implemented by using correspondingly designed software to be executed by a processor of an existing device, or by using dedicated device hardware.

The invention claimed is:

1. A method of controlling content delivery to plural clients of a mobile communication network, the content being delivered to the plural clients over a radio access network of the mobile communication network, the method comprising:
   receiving, by a controlling entity, quality reports from the plural clients, wherein the controlling entity modifies a rule based on the received quality reports;
   providing, by the controlling entity, the rule to the network entity;
   collecting geo information of the plural clients by a network entity associated with the mobile communication network;
   evaluating, by the network entity, the collected geo information of the plural clients based on the rule:
      to determine whether the content delivery is to be adapted; and
      to identify a region for which the content delivery is to be adapted;
   selectively outputting, by the network entity, a message to a controlling entity outside the mobile communication network in response to it being determined that the content delivery is to be adapted; and
   controlling, by the controlling entity, the content delivery in response to receiving the message, so as to adapt the content delivery for clients located in the identified region.

2. The method of claim 1, wherein, in order to adapt the content delivery for the clients located in the identified region, the controlling entity generates a control message to at least one of:
   adapt a content delivery rate at which a content source provides content to the clients located in the identified region;
   perform a quality of service bearer adaptation in the mobile communication network over which content is delivered;
   prioritize clients located in the identified region based on subscription information.

3. The method of claim 2, wherein the controlling entity:
   selects a content delivery rate at which a content source delivers content to the clients in the region based on the received message;
   generates the control message based on the selected content delivery rate.

4. The method of claim 3, wherein different content delivery rates are selected for at least two different cells of the radio access network.

5. The method of claim 3:
   wherein the controlling entity transmits the control message to an execution point;
   wherein, in response to receiving the control message, the execution point directs a request for content coming from a client located in the identified region to a content server of the content source which is associated with the selected content delivery rate.

6. The method of claim 3:
   wherein the controlling entity sends the control message to the clients located in the identified region;
   wherein, in response to receiving the control message, the clients located in the identified region request the content from a content server of the content source which is associated with the selected content delivery rate.

7. The method of claim 1:
   wherein the evaluating comprises predicting a region affected by a congestion situation in the radio access network based on the collected geo information of the plural clients;
   wherein the controlling entity controls the content delivery to relieve congestion in the radio access network in the identified region.

8. A controlling entity configured to control content delivery to plural clients of a mobile communication network, the controlling entity being outside the mobile communication network and comprising:
   an interface for communication with a network entity of the mobile communication network;
   a control circuit configured to:
      receive quality reports from the plural clients, wherein the controlling entity modifies a rule based on the received quality reports;
      output the rule for evaluating geo information of the plural clients to the network entity over the interface;
      receive a message from the network entity over the interface, the message containing information on a location-dependent adaptation of the content delivery; and
      adapt the content delivery in a location-dependent manner for clients located in a region based on the received message, the region determined based on the information.

9. The controlling entity of claim 8, wherein the control circuit is configured to generate a control message based on the received message to adapt a content delivery rate at which a content source provides content to the clients located in the region.

10. The controlling entity of claim 9:
    wherein the information contained in the message comprises addresses of the clients located in the region;
    wherein the control circuit is configured to generate the control message based on the addresses.

11. The controlling entity of claim 10, wherein the control circuit is configured to send the control message to an execution point which receives a client request for content delivery, the control message comprising at least a subset of the addresses.

12. The controlling entity of claim 9:
    wherein the information contained in the message comprises a region identifier for the region;
    wherein the control circuit is configured to send the control message to the clients located in the region.

13. The controlling entity of claim 12, wherein the control circuit is configured to generate the control message based on a content delivery rate selected based on the received message, the control message including at least one of a tag and a command to transmit a manifest file.

14. The controlling entity of claim 9, wherein the control circuit is configured to:
    generate a further control message based on the message;
    output the further control message to the mobile communication network to perform a Quality of Service bearer adaptation.

15. The controlling entity of claim 8, wherein the control circuit is configured to adapt the content delivery based on subscription types of the clients located in the region.

16. The controlling entity of claim 8, wherein the control circuit is configured to:
    evaluate quality reports received from the plural clients to which the content is delivered;
    adapt the rule based on the received quality reports;
    output the adapted rule to the network entity over the interface.

17. The method of claim 1, wherein the network entity is under the control of an operator of the mobile communication network, and wherein the controlling entity is under the control of another operator outside the mobile communication network.

18. The method of claim 1, wherein the mobile communication network comprises a Long Term Evolution (LTE) core network.

* * * * *

UNITED STATES PATENT AND TRADEMARK OFFICE
CERTIFICATE OF CORRECTION

PATENT NO. : 10,455,447 B2
APPLICATION NO. : 14/125976
DATED : October 22, 2019
INVENTOR(S) : Perkuhn et al.

Page 1 of 1

It is certified that error appears in the above-identified patent and that said Letters Patent is hereby corrected as shown below:

In the Specification

In Column 9, Line 17, delete "of the" and insert -- the --, therefor.

In Column 21, Line 7, delete "on of" and insert -- of --, therefor.

In Column 21, Line 11, delete "on of" and insert -- of --, therefor.

Signed and Sealed this
Thirty-first Day of March, 2020

Andrei Iancu
*Director of the United States Patent and Trademark Office*